Sept. 3, 1957     J. M. VAN HOFWEEGEN     2,805,395
PUSH-PULL FREQUENCY MODULATOR
Filed June 28, 1954
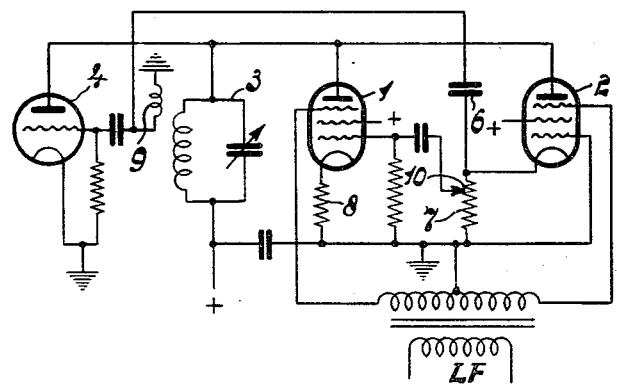
*INVENTOR*
JOHANNES MARINUS VAN HOFWEEGEN
BY
*AGENT*

United States Patent Office 2,805,395
Patented Sept. 3, 1957

2,805,395
PUSH-PULL FREQUENCY MODULATOR

Johannes Marinus van Hofweegen, Eindhoven, Netherlands, assignor, by mesne assignments, to North American Philips Company, Inc., New York, N. Y., a corporation of Delaware Application June 28, 1954, Serial No. 439,789

Claims priority, application Netherlands July 11, 1953

3 Claims. (Cl. 332—24)

The invention relates to a push-pull frequency modulator comprising a resonance circuit and two modulator tubes, to which a modulating oscillation is supplied in push-pull in order to modulate in push-pull the effective resonance frequency of the circuit.

It has particularly for its object to obtain, by simple means, a satisfactory linearity between this effective frequency and the modulating oscillation. The term "effective resonance frequency" is to be understood to mean herein the resonance frequency which the circuit exhibits in fact owing to the modulator tubes.

The invention has the feature that the high-frequency voltage of the circuit is supplied through a network common to both modulators and providing a phase displacement of substantially 90°, to the cathode of one modulator tube and to the grid of the other.

The invention will be described with reference to the embodiment shown in the accompanying drawing.

Reference numerals 1 and 2 designate the two modulator tubes, 3 designates a resonance circuit, which constitutes the frequency-determining circuit of an oscillator 3—4. The effective resonance frequency of the circuit 3 and hence the oscillation frequency of the oscillator 3—4 may, as is known, be varied by supplying the voltage of the circuit 3 with a phase shift of substantially 90° to the modulator tubes 1 and 2, to which a modulating oscillation LF is supplied in push-pull and of which the modulated total anode current is supplied to the circuit 3 either directly, as is shown, or through the control-grid of the oscillator tube 4 (in the latter case this tube introduces additional distortion).

According to the invention only one phase-displacing network 6—7, common to the two tubes 1 and 2, is used, this network supplying the voltage of the circuit 3 with a phase displacement of substantially 90° to the grid of the tube 1 and to the cathode of the tube 2. This yields the advantage that the circuit 3 is less damped than with the use of two-phase-displacing networks, whilst yet the modulated total current produced by the tubes 1 and 2 is available for the resonance circuit 3. The resistor 8 in the cathode circuit of tube 1, which is chosen to be equal to the resistor 7 of the phase-displacing network 6—7 serves to feed back the tube 1 to the same extent as the tube 2.

The voltage across the circuit 3 is supplied preferably through an inverting transformer, which may be formed by the inductance of the circuit 3 and the feed-back winding 9, to the capacitor 6 of the phase-displacing network 6—7, so that the phase displacement of 90°, required for a minimum of distortion, can be more readily adjusted accurately. In order to reduce distortion, the control-grid of the tube 1 is not connected to the junction of the capacitor 6 and the resistor 7 but is connected to a tapping 10 of this resistor 7, so that the variations in mutual conductance of the tubes 1 and 2 may be rendered identical.

What is claimed is:

1. A push-pull frequency modulator comprising a resonant circuit, means for producing oscillations in said resonant circuit, two modulator tubes each having a cathode, a grid, and an anode, means connecting said anodes to said resonant circuit, a source of modulating signals connected to vary the conductance of said tubes in electrical push-pull, a phase-shifting network for causing a phase shift of substantially 90 degrees, means for feeding said oscillations to the input of said phase-shifting network, and means connecting the output of said phase-shifting network to the cathode of one of said tubes and to the grid of the other of said tubes.

2. A modulator as claimed in claim 1, in which said phase-shifting network comprises a series combination of a capacitor and a resistor, the cathode of said one tube being connected to the junction of said resistor and capacitor, and the grid of said other tube being connected to a point on said resistor.

3. A modulator as claimed in claim 1, in which said means connecting said anodes to said resonant circuit comprises a phase-inverting transformer.

References Cited in the file of this patent
UNITED STATES PATENTS 2,238,249   Crosby _____ Apr. 15, 1941